United States Patent Office 2,880,194
Patented Mar. 31, 1959

2,880,194
THERMOSETTING COATING COMPOSITIONS

David W. Glaser, St. Paul, Minn., assignor to General Mills, Inc., a corporation of Delaware No Drawing. Application March 8, 1956
Serial No. 570,209

9 Claims. (Cl. 260—47)

This invention relates to novel protective coatings. More specifically, this invention relates to novel compositions of epoxy resinous materials and certain aliphatic diamines and the method of curing these compositions.

Various amines and diamines have been used to cure epoxy resins. Diamines are generally preferred because they produce cross-linked products having desirable characteristics such as chemical resistivity, high heat distortion temperatures, and so forth.

It has now been discovered that aliphatic fatty diamines having a relative high iodine number may be mixed with epoxy resinous compositions in such a manner that a unique surface coating is obtained. One unique feature of this surface coating is that it contains 100% "solids." In other words no solvent or carrier is required, and as a coating it is "self-contained" i.e., the curing and hardening is a function of the aliphatic fatty diamine and epoxy resinous compositions. There is no need for oxygen penetration of the coating as in the case of protective coatings employing drying oils or other constituents that harden upon exposure to the air. There is no need for contact with the atmosphere in order to permit the evaporation of solvent or other carrier. Graphic proof of the uniqueness of this composition as a surface coating is that it will cure and harden in thick films which afford protective coatings of maximum durability and corrosion resistance. Previously the preparation of smooth films over about 3 mils thick in one application have been for the most part unsatisfactory. By employing the compositions hereinafter set forth it is possible to achieve a film thickness as high as 25 mils and higher.

Aliphatic diamines envisioned by this invention have the structural formula

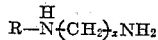

where R is predominantly unsaturated aliphatic hydrocarbon radicals containing 8 to 22 carbon atoms and $x$ is an integer from 1 to 4 and is preferably 3. Suitable aliphatic diamines are those which have an iodine number in the range of 75 to 200 and an amine number of 225 to 350. The iodine number is the number of grams of halogen expressed as halogen absorbed by a 100 gram sample. The amine number is an expression of the number of milligrams of potassium hydroxide equivalent to the amine groups in a one gram sample.

These diamines may be prepared by the addition of acrylonitrile to fatty amines and subsequently reducing the nitrile formed to the corresponding diamine. This reaction is outlined below.

RNH₂ + H₂C=CH—CN ⟶

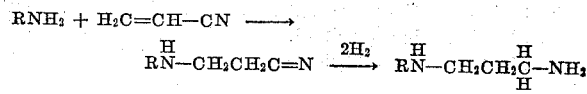

where R is as shown above.

The fatty amine employed in the above reaction can be prepared by the reaction of ammonia with fatty acids to form the fatty nitrile and subsequent reduction of the nitrile to the corresponding fatty amine. The procedures and conditions employed in the above reactions are well-known and practiced commercially.

The fatty acids used to prepare the fatty amine are generally derived from naturally occurring vegetable and animal fats and oils and will have 8 to 22 carbon atoms with a preponderance of the acids containing 18 carbon atoms. Illustrative vegetable oils are soybean oil, cottonseed oil, coconut oil, palm oil, tung oil, castor oil etc. Fats and oils derived from animals are exemplified by tallow and greases. The fatty acids derived from each of these fats and oils are complex mixtures that are not easily separated into the individual acids. For this reason the fatty acids employed to prepare the fatty amines will generally be a mixture. One method of classifying acid mixtures derived from the various oils is by their iodine number. As stated above, the iodine number is the number of grams of halogen expressed as iodine which will react with a 100 gram sample. Or in other words as pertinent to fatty acids it is an indication of the amount of unsaturated fatty acids in the mixture. Common unsaturated acids are oleic, eleostearic, dehydrated ricinoleic, linoleic, linolenic, and ricinoleic acid. Common saturated acids are stearic, palmitic, and lauric acid. For the purposes of this invention it is preferable to use unsaturated fatty acids or mixtures containing a high proportion of unsaturated fatty acids having an iodine number greater than 110 and less than 200. This type of acid mixture may be obtained from an oil such as soybean oil, cottonseed oil, tung oil and other oils having a high iodine number or by separating the saturated fatty acids from the unsaturated fatty acids by distillation or crystallization. In this regard it is important to note that substantially all the double bonds or unsaturation of the fatty acid long-chained aliphatic radical should not be disturbed during the preparation of the fatty nitrile, fatty amine and fatty diamine. Alternatively, suitable diamines may be obtained by separating diamines having a sufficiently high iodine number from various other diamine mixtures which do not have a sufficiently high unsaturation. This may be accomplished most easily by fractional crystallization. Such a separation is analogous to the well-known "winterizing" of fats and oils.

The commercially available diamines of the above general type do not have sufficiently high iodine numbers for the purposes of this invention and a separation as described above was carried out to obtain diamines having an iodine number greater than 75. The exact reason for the inferiority of the lower iodine number diamines is not known but it has definitely been observed that coatings in which such low iodine number diamines were used were speckled throughout with tiny areas in which the coating was brittle and broke loose from the supporting surface.

The epoxy resins (glycidyl polyethers) employed in this invention are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily available to commercial products.

Typical polyhydric phenols useful in the preparation of epoxy resins include resorcinol and various bisphenols resulting from the condensation of phenol with aldehydes and ketones such as formaldehye, acetaldehyde, acetone, methyl ethyl ketone and the like. A typical epoxy resin is the reaction product of epichlorohydrin and 2,2-bis(p-hydroxy phenyl) propane (Bisphenol A), the resin having the following theoretical structural formula,

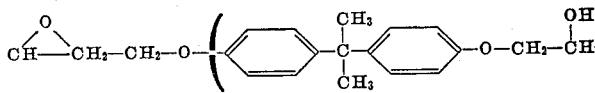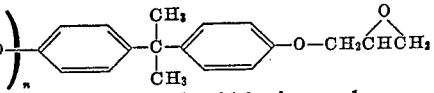

where $n$ is 0 or an integer up to 10. Generally speaking, $n$ will be no greater than 2 or 3 and is preferably 1 or less.

Epoxy resins may be characterized further by reference to their epoxy equivalent, the epoxy equivalent of pure epoxy resins being the mean molecular weight of the resin divided by the mean number of epoxy radicals per molecule, or in any case the number of grams of epoxy resin equivalent to one mole of the epoxy group or one gram-equivalent of epoxide. Epoxy resinous compositions having an epoxy equivalent of 140 to 1000 may be employed in this invention depending upon the application desired and conditions employed, however an epoxy equivalency of 140 to 350 is preferred.

The following examples illustrate working embodiments of this invention. All "parts" are expressed as parts by weight.

*Example I*

60 parts of an epoxy resin having an epoxy equivalency of approximately 180 and prepared by reacting Bisphenol A and epichlorohydrin was mixed with 40 parts of a fatty aminopropylamine having an iodine number of 95 and derived from the unsaturated fatty acids of soybean oil. This mixture had a viscosity of C on the Gardner-Holdt scale when freshly mixed and a viscosity of H after standing 2 hours. Coatings of this composition were only slightly tacky after curing at room temperature for 1 day and were tack free after curing for 4 days at room temperature. Coatings of this composition 5 mils thick on glass panels had a Sward hardness of 8 after curing at room temperature for 7 days and a Sward hardness of 4 after being baked 15 minutes at 300° F. and coatings on steel panels had an impact resistance after curing at room temperature greater than 172 inch pounds. The same steel panels after 118 hours in the Weather-O-Meter still had an impact resistance greater than 172 inch pounds. Coatings from the above composition remained hard after overnight immersion in 20% NaOH and 37% $H_2SO_4$. The general appearance of the coatings prepared from the above composition were excellent.

*Example II*

21.4 ml. of an epoxy resin (ERL-2795 sold by the Bakelite Company) was mixed with 18.6 ml. of a fluid fatty aminopropylamine having an iodine number of 89 and the resulting mixture had a viscosity of C–D on the Gardner-Holdt scale. This composition was readily sprayable through an ordinary spray gun at room temperature. After being baked at 300° F. for 15 minutes panels coated in this fashion had a smooth, glossy and hard coating.

Thus, the combination of this invention are especially valuable 100% "solids" coatings that show a remarkable chemical and weather resistivity which may be cured at room temperature or by baking. They may be pigmented in the same fashion as other paints or coatings. Although it is preferable to use the compositions of this invention as 100% "solids" coatings in certain applications it may be desirable to use various solvents with them. Illustrative solvents are xylene, isobutyl methyl ketone, benzene, petroleum spirits and the like. It will also be recognized that the compositions of this invention will also be useful as adhesives and laminates.

Therefore, many modifications and variations of the invention as hereinbefore set forth may be made without departing from the spirit and scope thereof, and therefore only such limitations should be imposed as are indicated in the appended claims.

Having described my invention, I claim:

1. Compositions suitable as protective coatings comprising (a) an aliphatic diamine having an iodine number greater than 75 and the structural formula

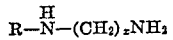

in which R is an aliphatic hydrocarbon radical having 8 to 22 carbon atoms and $x$ is an integer from 1 to 4, and (b) a glycidyl polyether of 2,2-bis(p-hydroxy phenyl) propane having an epoxy equivalent of 140 to 1,000.

2. The composition of claim 1 in which R is derived from a mixture of fatty acids having an iodine number greater than 110 and less than 200.

3. The composition of claim 1 in which $x$ is 3.

4. Compositions suitable for protective coatings comprising an aliphatic diamine having the structural formula

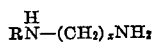

in which R is an aliphatic hydrocarbon radical having 8 to 22 carbon atoms and $x$ is an integer from 1 to 4 and having an iodine number greater than 75, said diamine being derived from a diamine mixture having an iodine number less than 75 by fractional crystallization, and a glycidyl polyether of 2,2-bis(p-hydroxy phenyl)propane having an epoxy equivalent from 140 to 300.

5. A one-step method of applying a protective coating at room temperature, said coating having a thickness greater than 5 mils which comprises a single application of a composition composed substantially of an aliphatic diamine having the structural formula

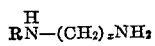

in which R is an aliphatic hydrocarbon radical having 8 to 22 carbon atoms and $x$ is an integer from 1 to 4 and having an iodine number greater than 75 and a glycidyl polyether of 2,2-bis(p-hydroxy phenyl) propane having an epoxy equivalent of from 140 to 300 to the substance to be protected.

6. The method of claim 5 in which the application is by spraying.

7. The method of curing epoxy resinous materials which comprises reacting at a temperature at least as high as room temperature, a glycidyl polyether of 2,2-bis-(p-hydroxy phenyl)propane having an epoxy equivalent of 140 to 1000 with an aliphatic diamine having an iodine number greater than 75 and the structural formula $RNH\text{-}(CH_2)_xNH_2$ in which R is an aliphatic hydrocarbon radical having 8 to 22 carbon atoms and $x$ is an integer from 1 to 4.

8. The method of claim 7 in which R is derived from fatty acids having an iodine number greater than 110 and less than 200.

9. The method of claim 7 in which $x$ is 3.

References Cited in the file of this patent

UNITED STATES PATENTS

| | | |
|---|---|---|
| 2,165,515 | Schmidt | July 11, 1939 |
| 2,510,885 | Greenlee | June 6, 1950 |
| 2,642,412 | Newey et al. | June 16, 1953 |
| 2,723,241 | De Groote et al. | Nov. 8, 1955 |